United States Patent [19]

Unland

[11] 3,886,260

[45] May 27, 1975

[54] PROCESS FOR REDUCING NITROGEN OXIDES

[75] Inventor: Mark Leroy Unland, Creve Coeur, Mo.

[73] Assignee: Monsanto Company, St. Louis, Mo.

[22] Filed: Dec. 14, 1972

[21] Appl. No.: 315,066

Related U.S. Application Data

[63] Continuation-in-part of Ser. No. 183,227, Sept. 25, 1971, abandoned.

[52] U.S. Cl. ................. 423/213.5; 60/274; 60/301
[51] Int. Cl. ............................................ B01d 53/34
[58] Field of Search ........... 423/213, 214, 239, 351; 60/274, 301

[56] References Cited
UNITED STATES PATENTS

| | | | |
|---|---|---|---|
| 2,601,221 | 6/1952 | Rosenblatt et al. | 423/351 |
| 3,118,727 | 1/1964 | Cohn | 423/239 |
| 3,224,831 | 12/1965 | Stephens | 423/213 |
| 3,230,034 | 1/1966 | Stiles | 423/213 |
| 3,397,034 | 8/1968 | Tulleners et al. | 423/214 |
| 3,397,154 | 8/1968 | Talsma | 423/213 |
| 3,637,344 | 1/1971 | Thompson | 423/213 |
| 3,733,181 | 5/1973 | Tourtellotte et al. | 423/213 X |

FOREIGN PATENTS OR APPLICATIONS 653,256  7/1961  Canada .............................. 423/239

OTHER PUBLICATIONS

Lang et al., "Nox Reduction Catalysts For Vehicle Emission Control," SAE paper 720480; May 1972.

Bernstein et al., "Application of Catalysts to Automotive Nox Emissions Control," SAE paper 710014; Jan. 1971.

*Primary Examiner*—G. O. Peters

[57] ABSTRACT

A catalyst for automotive exhaust clean-up contains very small amounts of rhodium. The compositions are particularly effective for reducing nitrogen oxides.

18 Claims, 3 Drawing Figures

PROCESS FOR REDUCING NITROGEN OXIDES

This application is a continuation-in-part of my co-pending application Ser. No. 183,227 filed Sept. 23, 1971, now abandoned.

BACKGROUND OF THE INVENTION

The present invention relates to means of removing noxious materials from engine exhausts. In particular the invention concerns processes for reducing nitrogen oxides present in exhaust of automotive engines, and to catalysts useful in such process.

It is well known that when hydrocarbon fuels are burned in automotive engines that combustion is incomplete. This applies whether the engine is of the internal combustion type or other alternative vehicular power sources. Substantial amounts of fuel are either left unburned or are partly combusted. Thus automotive exhaust contains large amounts of monoxide and hydrocarbons along with carbonaceous residues (particulate form) among products of incomplete combustion which are generally considered to be noxious. In addition, a fourth general category of pollutant is formed, termed $NO_x$ ($NO$ and $NO_2$). Products of complete combustion are also present in large amounts and consist of water and carbon dioxide. Residues of air employed to combust the hydrocarbon fuel include oxygen and nitrogen. Hydrogen is generally present along with components emanating from the composition of the hydrocarbon fuel utilized. For example, most present day gasolines contain organic lead which decomposes to yield noxious lead compounds.

The instantaneous composition of vehicular exhaust is a function of many factors, including parameters relating to engine design, and tuning, and driving mode, as well as fuel composition. Thus, it is difficult to specify a typical exhaust composition. Generally speaking, however, when present day automobile engines are started cold, carbon monoxide levels of about 5 to about 15 volume percent, along with hydrocarbon levels of about 5,000 to about 15,000 parts-per-million are not unusual.

Carbon monoxide and hydrocarbon levels fall rapidly after engine start to levels of about 3 percent and 1000 parts-per-million respectively in about the first 100 seconds of engine operation. As the engine continues to warm to normal operating temperatures, exhaust compositions containing about 1 to about 2 percent carbon monoxide and several hundred parts-per-million hydrocarbon are oftentimes observed with present day automobiles.

Nitrogen oxide evolution with present automobile engines is closely tied in part to engine tuning and driving mode. For example, with very lean and very rich air to fuel ratios, nitrogen oxide emissions are relatively low. In between, higher emissions are observed. In addition, relatively higher $NO_x$ emissions result from high speed driving modes. Generally, $NO_x$ emissions are less than 0.3 or 0.4 percent on a volume basis, and on the average around 0.15%.

Exhaust gases from automotive engines contribute a substantial portion of total air pollutants in many areas, for example urban areas, today. Thus, unburned hydrocarbons, carbon monoxide, particulate matter and $NO_x$ - particularly NO, are typical constituents of automotive exhaust which contribute to air pollution. Accordingly, means have been sought to control said emissions. Improved systems for controlling emissions of hydrocarbons and carbon monoxide, such as finer control of fuel combustion, have already been implemented. Such improvements, however, have led to an increase in $NO_x$ emissions rather than a decrease.

It is known that under certain circumstances nitrogen oxides are reducible through use of certain reducing agents over noble metal catalysts. Some such reducing agents may be present in automotive exhaust to some extent, depending upon the mode of operation.

It is further known that purification of automotive exhaust presents a difficult problem, in part due to the variety of pollutants contained therein. For example, certain impurities are conveniently rendered non-noxious by oxidation while others can be reduced to non-noxious products. Examples in the former category include carbon monoxide and hydrocarbons while $NO_x$ is an example of a pollutant which can be removed through a reductive treatment. Consequently, different modes of removal may be required for removal of different types of impurities.

While procedures may be designed for removal of one pollutant type, such procedures must be considered with respect to their applicability in the presence of other exhaust gases, the possible production of new pollutants, and as to their compatibility with procedures for removing other pollutants. For example it is known that certain catalysts will promote the production of $NH_3$ from the exhaust of an engine operated in a fuel-rich or reducing mode. Presumably, the $NH_3$ is formed from the reaction of $NO_x$ with $H_2$ which is known to be present in the exhaust or with atomic or molecular hydrogen which may be produced in situ via the water gas shift reaction over the catalyst of interest. Regardless of the method of production, the fact remains that $NH_3$ is often found in the effluent gas stream after passage of the exhaust gases over the catalyst bed. In spite of the fact that $NH_3$ in an automobile exhaust is not, at present, legally a pollutant, it is most certainly an obnoxious effluent component which cannot be tolerated and care must be taken either to prevent its formation or provide for its subsequent removal.

While the present invention is concerned primarily with reductive removal of $NO_x$ from pollutant streams containing other pollutants and reactants (for example, hydrogen, oxygen, carbon monoxide), it will be apparent from the discussion herein that the catalysts of the present invention can also function solely as oxidation catalysts. Furthermore, as will be apparent, simultaneous removal of carbon monoxide, hydrocarbons and nitrogen oxides is also possible over the catalysts of the present invention.

SUMMARY OF THE PRESENT INVENTION

In the present invention a catalyst containing a very small amount of rhodium or iridium is used under reducing conditions to remove the nitrogen oxides in automobile exhaust. The invention involves a catalyst having a support containing thereon rhodium or iridium in amounts up to 0.005 parts by weight per 100 parts by weight of support. A transition alumina is a suitable support. The reduction process can advantageously be used in conjunction with an oxidation process in a separate catalyst bed to oxidize other gaseous components. Other aspects of the present invention will be apparent from the following detailed description.

DETAILED DESCRIPTION OF THE INVENTION

Figure 1:
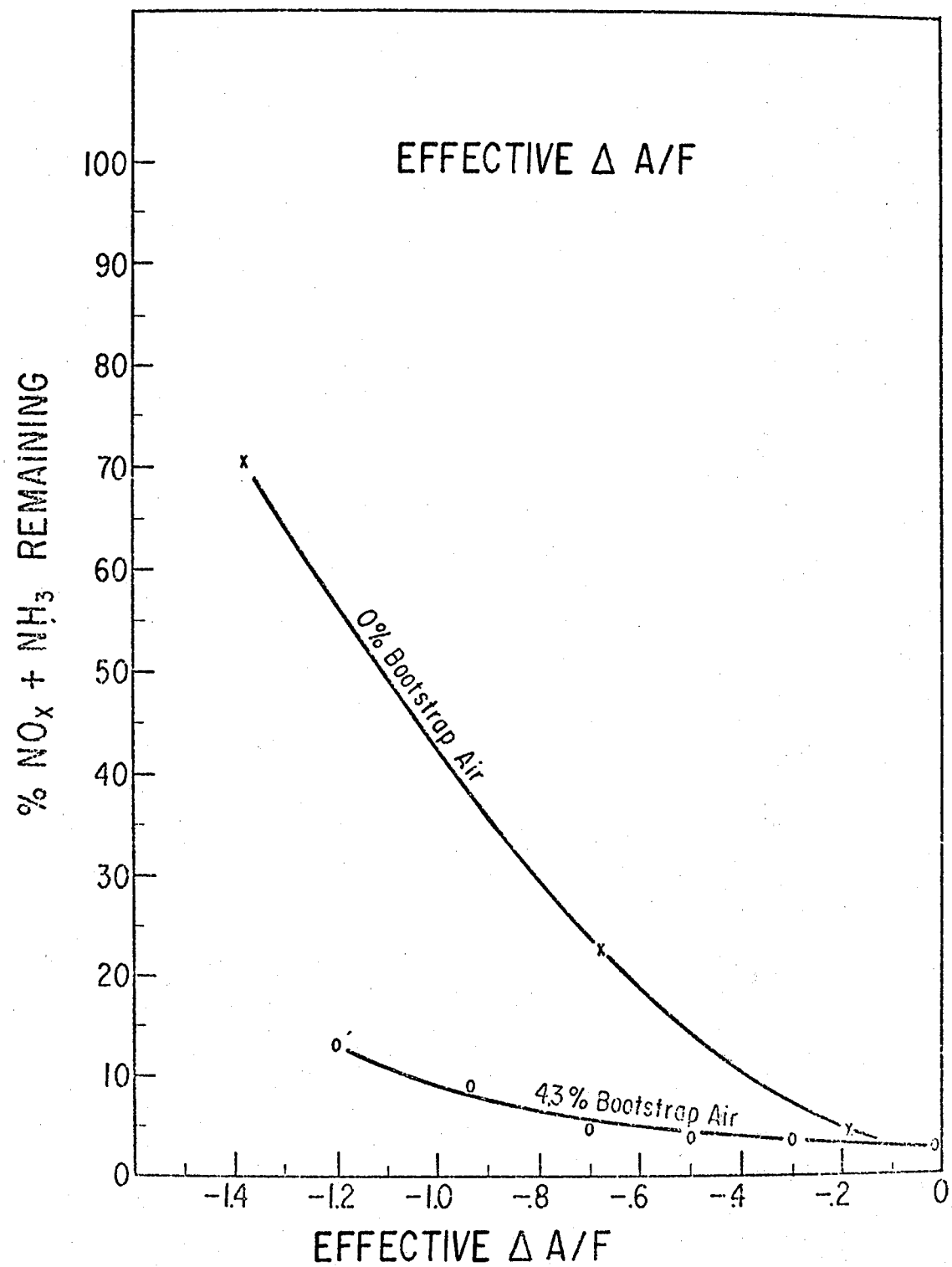

The present catalyzed reduction of nitrogen oxides in contact with rhodium or iridium involves a reducing agent to effect the reductions; carbon monoxide and/or hydrogen are relied upon to serve this purpose in the present invention. Automobile exhaust contains substantial amounts of carbon monoxide, lesser amounts of hydrocarbons, and $NO_x$ as major pollutants. In addition, oxygen is present in variable amounts. Large amounts of oxygen, particularly oxidizing amounts supplied continuously, retard reduction of $NO_x$, either directly or by reaction with the reducing components of the exhaust gases. It is therefore necessary for $NO_x$ reduction that on the average the conditions of operation with the catalysts of the present invention be reducing, i.e., that the amount of oxygen present be less than that required to oxidize all the reducible components of the exhaust.

It is understood that the amounts of the oxidizable and reducible exhaust components can vary due to changes in engine tuning, driving mode, etc. An important factor with regard to allowable oxygen concentration is therefore the level of carbon monoxide and hydrogen also present. With higher levels of carbon monoxide and hydrogen present more oxygen can be tolerated and vice-versa. Ordinarily, however, the amount of oxygen present when employing rhodium or iridium catalysts should be less than 2 percent by volume; usually less than 1 percent. The amount of oxygen will often be less than one-half that of the carbon monoxide on a volume basis.

In one embodiment of the present invention the air-to-fuel ratio is regulated only to the point of being, on the average, on the fuel-rich side of stoichiometric, with only brief periods of operation on the lean side. This will provide enough reducing agent in the exhaust to react with all $NO_x$ and residual $O_2$ which may be present. The good activity and thermal stability of the low rhodium and iridium catalysts of this invention will then provide adequate control of $NO_x$. The air-to-fuel ratio, on a stoichiometric basis, for rich operation is generally in the range of from about 10 percent less-than-stoichiometric air up to about 2 percent more-than-stoichiometric air. On the average, less than stoichiometric amounts of air are employed for treating automotive exhaust with rhodium or iridium catalysts and it is advantageous to avoid lean operation.

In a second embodiment of the present invention, the amount of oxygen in the exhaust gases is regulated so as to have efficient reduction of $NO_x$ in contact with the rhodium and iridium catalysts described herein, without production of substantial amounts of ammonia. This can be accomplished by operating on the rich side of stoichiometric, as indicated above, but still providing sufficient oxygen to retard ammonia production. In general, in this embodiment the amount of oxygen in the exhaust gases should be at least two thirds of stoichiometric with regards to reducible components of the gas. For example, with 1 percent CO and 0.5 percent $H_2$, the desirable $O_2$ content will be at least about 0.5 percent such as in the range of 0.5 to 0.75 percent or 1 percent, and such ranges generally give best results with respect to good nitrogen oxide conversion with low ammonia production.

In a third embodiment of the present invention, somewhat more rich exhaust stoichiometries are utilized with the rhodium and iridium catalysts of the present invention. In part, the limit as to how rich it is possible to operate is dependent on engine parameters. Thus engine operation at very rich stoichiometries incurs excessive fuel penalties in addition to detracting from car drivability. However, at rich, but somewhat higher air-to-fuel ratios than those incurring disadvantages are discussed, $NO_x$ can be removed effectively. Higher amounts of ammonia ordinarily result, but these can be controlled by proper use of a second catalyst bed for the purpose of oxidizing $NH_3$, CO and hydrocarbons to non-noxious gases such as $N_2$, $CO_2$ and $H_2O$. It has been found that many noble metal and transition metal oxide oxidation catalysts, operating in distinct temperature regions, oxidize $NH_3$ selectively to non-noxious products. For example copper-containing catalysts can serve to convert substantially all $NH_3$ to $N_2$ and $N_2O$. Specifically, compositions containing copper and chromium on alumina supports are effective for this purpose. It is also known that within certain distinct temperature regions CO and hydrocarbon oxidation is virtually complete. Control of the temperature of the second reactor may require a means for cooling of the exhaust gases between the reduction and oxidation reactors. Such cooling could be provided by an appropriate combination of temperature sensors, bypass valves, and an interreactor cooling loop or heat exchanger. The temperature sensors can be set to open and close the valves as necessary to control the gas temperatures within the desired limits by passage either through the cooling loop or directly to the second reactor, or in alternating fashion as may be appropriate. In this mode of operation it will also be necessary to provide sufficient oxygen for the reactions occuring in the second reactor, as by addition of secondary air prior or at the second reactor.

As an additional illustration of the possible application of the catalysts of the present invention, one can envision the use of a selectivity promoter such as halide in conjunction with noble metal which would allow the engine to be operated at or very close to the point of oxidant-reductant stoichiometry. In this embodiment control of air-to-fuel ratio is utilized, but, if achieved, the catalyst is capable of providing a substantial reduction in NO, CO and hydrocarbons without producing appreciable amounts of $NH_3$. The effect of halide in the catalyst composition, as will be shown later by example, is to reduce the severity of the control requirements on the air-to-fuel ratio. Even in the absence of sufficient control to avoid ammonia production, the presence of halide can be advantageous in providing more latitude for brief excursions on the lean side of the fuel ratio.

Control of air-to-fuel ratio will ordinarily be employed to provide reducing conditions herein. However, other expedients can be adopted, such as methods of removing some oxygen prior to contacting the exhaust gases with the $NO_x$ catalytic composite, and any such procedures for providing the reducing conditions as herein specified necessary for $NO_x$ removal are considered within the present invention.

The above embodiments are only illustrative of the many possible modes of application of the present invention and do not exclude the other possibilities obvious to those familiar with the problems inherent in the catalytic removal of $NO_x$ from auto exhausts.

Other aspects of use of the catalysts of the present invention are of interest in order to understand the utility of said catalysts. In some methods of exhaust treatment, supplemental air is continuously added to exhaust prior to contact with a catalytic composite. In most cases, such systems are designed to obtain combustion of oxidizable exhaust components. With the catalysts of the present invention, addition of supplemental air is not essential for the purposes of reducing $NO_x$ so long as air to fuel ratio control is as prescribed hereinbefore. However, in certain situations use of supplemental air even for $NO_x$ control is of potential value. For example, it may be beneficial with certain systems to operate automobile engines richer than needed to obtain proper exhaust gas stoichiometries for high $NO_x$ conversion coupled with low ammonia. Supplemental air can then be added to the exhaust prior to contacting the catalyst to obtain proper oxygen content. The supplemental air can be added either continuously or in a pulsed mode. An effect obtained by this procedure is to produce higher catalyst temperatures. However with rhodium catalyst the result in higher $NO_x$ conversion with low ammonia is greater than that to be expected from higher temperature. In some cases, use of pulsed air injection through a single catalyst bed can yield important reductions in carbon monoxide and hydrocarbons in addition to $NO_x$. It may also be desirable to add supplemental air prior to a subsequent treatment to oxidize oxidizable components of the exhaust gases, possibly with a separate catalyst bed, or to alternate reduction and oxidation treatments by intermittent air injection.

While the catalysts of the present invention are particularly efficient for removal of $NO_x$ under conditions as described herein, the same catalysts can function as oxidation catalysts under over-all oxidizing conditions. Thus, supplemental air can be added to the exhaust prior to contacting the catalytic composite sufficient to provide oxygen for combusting oxidizable components. At the low levels of rhodium (iridium) utilized in the catalysts of the present invention, a particularly efficient oxidation catalyst system results from use of small volume monolithic units mounted in the post-manifold position. By this means, rapid heat-up is achieved with concurrent efficient removal of carbon monoxide and hydrocarbons.

The reduction catalysts utilized herein employ a particular noble metal as the active catalytic material. Platinum and the other noble metals find usefulness in industry for oxidation, reduction, and catalytic reforming reactions among others. However, without exception, it has been found that high loadings (e.g. 0.1 to 1.0 percent Pt on alumina for reforming catalysts) are necessary to obtain the desired activity and/or selectivity. Such heavily loaded catalysts might be useful for $NO_x$ removal in an auto exhaust application were it not for the following considerations: The current annual production of automobiles in the United States is around ten million vehicles. For illustrative purposes, suppose that one were required to use 0.1% $Pt/Al_2O_3$ and that the total volume of the catalyst beds were 100 in.³ and weighed about 820 grams. In other words, at the 0.1% Pt level, 0.82 grams of Pt would be required per vehicle and, therefore, ten million cars would require 250,000 oz. of Pt per year which is 17% of the 1,500,000 oz/yr estimated to be available from the Western world in the early seventies. The situation with Rh (at the 0.1 percent level) is clearly impossible since the estimated annual free world supply is only 80,000 oz. It is clear that from the standpoint of noble metal availability one is forced to use catalysts with much lower loadings. Unfortunately, as the loading of platinum is reduced substantially below 0.1 percent most such catalysts suffer severe activity losses. For example, in the present application of $NO_x$ removal, platinum loadings of 0.001 percent by weight are essentially ineffective.

Thus, it was quite unexpected to find that for $NO_x$ removal, rhodium catalysts are highly effective at extremely low loadings. The amounts of rhodium can be substantially less than 0.01 percent by weight, such as less than 0.005 percent by weight of the metal-plus-support, or 0.003 percent or even 0.001 percent or less by weight of the metal-plus-support. These are extremely low concentrations of active catalyst material, whether considered on a weight basis, or on a basis of active material per volume occupied, or on a basis of active material per volume of gas treated. It is surprising to find such low amounts to be effective, and also surprising to find that even in these low concentration ranges, decreases in rhodium concentration over a wide range do not significantly lower activity. It has further been found that lowering the amount of rhodium, particularly to the point of decreasing the activity, results in slightly lowering the production of ammonia. As pointed out above, it is desirable to avoid ammonia production or keep it to a minimum. Even if the lower amounts of rhodium cause a somewhat lowered activity, this can be compensated for by design factors such as a larger catalyst bed, or a higher treatment temperature, thereby still obtaining adequate reduction of the nitrogen oxides. Higher amounts of rhodim are operative, such as amounts up to 0.1 percent or higher, but ordinarily there is no advantage in such amounts. The reduction catalysts utilized herein employ rhodium or iridium as an active catalytic material. Rhodium has a lower initiation temperature greater activity, and can be used in lower amounts than iridium, so rhodium is preferred for use herein. Rhodium is used for exemplifications herein, but iridium can generally be substituted therefor, although usually with some decrease in activity.

Other catalytically active metals or compounds can be present in the catalysts along with the rhodium or iridium. For example, the use of nickel or cobalt along with rhodium can be advantageous in controlling ammonia production. The rhodium has an influence in lowering $NO_x$ conversion temperatures, and ammonia production is lessened by decomposition over the Co or Ni component with the lowered ammonia production occuring at possibly lower temperatures than would prevail in the absence of the rhodium. If nickel or cobalt are used, the amount can be in the range of 1 to 10 percent or more by weight of the catalyst composite, e.g. 5 percent by weight.

The catalysts as utilized herein are dispersed on a support, generally of inorganic oxides such as alumina, silica, boria, thoria, titania, strontia, magnesia, zirconia, hafnia or combinations thereof. However, there are definite advantages in utilizing materials upon which rhodium is distributed in a highly dispersed state, such as activated alumina. Porous aluminas in various states of hydration can be advantageously used to provide good rhodium dispersion. Activated aluminas in the form of spheres, pellets, rings or extrusions or other shapes can be used. Alternatively, the actives can be dispersed on alumina coatings, an underlying support body being used in this case may, or may not, be alumina.

Transition aluminas are suitable for use as a support for dispersing rhodium (iridium). By the term transition alumina is meant an alumina other than alpha-alumina and also excluding certain hydroxides of aluminum. Reference is made to Technical Paper No. 10, second revision, from the Alcoa Research Laboratories. On page 9, various phases of alumina are enumerated. The following phases are not generally components in the finished catalysts of the present invention.

| | |
|---|---|
| 1. alpha alumina tri-hydrate | Gibbsite |
| 2. beta alumina tri-hydrate | Bayerite |
| 3. — | Nordstrandite |
| 4. alpha alumina mono-hydrate | Boehmite |
| 5. beta alumina mono-hydrate | Diaspore |
| 6. alpha alumina | Corundum |

Of the above cited phases, the use of alpha alumina is definitely not desired. The other phases may be present in small amounts but are not the preferred starting materials for preparing the catalysts of the present invention.

A preferred support for the catalysts of the present invention thus consists predominantly of a transition alumina. Although minor amounts of the phases listed above can be present, we prefer to prepare the catalysts of the present invention with an alumina consisting of at least 51 percent transition alumina. In other words, a preferred alumina support for the catalysts of the present invention consists predominantly of one or more of the transition alumina phases identified by XRD as gamma, eta, theta, iota, chi or kappa. Alumina is generally used in the exemplifications herein, and it is to be understood that alumina can be substituted in place of any of the supports discussed herein.

The form of the alumina used as support for the rhodium or iridium will depend upon the specific application. Alumina surfaces contained on particles or on rigid, unitary geometrical forms are generally preferred. For example, particle forms are exemplified by spheres, extrudates, rings, hollow cylinders, granules, or other shapes. The alumina can be present in particle forms up to 100 percent by weight or be present only as a surface coating. Likewise, monolithic supports, whatever their composition, can be coated with alumina. Generally, when applying alumina coatings to a support, the coating will consist of at least 0.1 wt. percent of the coated material. Alumina coatings of about 3 to 10 wt. percent appear even more useful with catalytic composites of the present invention. Higher amounts of alumina, while not necessarily detrimental do not appear to be necessary with the small amounts of rhodium or iridium preferred in the present invention.

Coatings can be applied in a variety of ways. A successful procedure involves use of dispersions of Dispal M alumina. The dispersion is conveniently made by use of acidic aqueous suspensions created by agitation. Among the acids which can be used are acetic, hydrochloric or nitric. A simple, effective procedure for obtaining the amount of coating required utilizes, on a weight basis, 20.0 g Dispal M powder, 1.2 g conc. $HNO_3$, and 78.8 g $H_2O$. The alumina powder is added to the acidified water and then shaken vigorously to obtain a suspension. Such suspensions appear to be stable for at least two hours. Stable suspensions do not result if the nitric acid concentration is substantially greater or substantially less than that indicated. It is understood that suspensions with greater stability can result through judicious choice of acid, and additives such as surfactants, resins, etc.

The body to be coated is then dipped in the suspension. When monolithic supports are to be coated it is advantageous to clear the channels of excess solution after dipping, for example by passing a suitable gas through the monolith or by other suitable means. After drying and air calcining at about 500°C, adhering coatings of an appropriate thickness for use in the present invention result.

In the catalysts of the present invention the rhodium is well-dispersed on the surface of the alumina support without much penetration into the surface of alumina particles. To obtain the desired effect from the very minute amounts of rhodium involved, it is essential to have the rhodium in position to contact the exhaust gases. It also appears advantageous that the alumina, prior to rhodium depositions, be characterized by open pores with a minimum of small pores, as it appears that rhodium deposited in small pores is subject to occlusion so as to prevent effective catalytic contact. It has been found that precalcining the alumina-containing body prior to deposition of the rhodium or iridium produces a catalyst of better and more stable activity. It appears that the pre-calcination has the effect of reducing the size of or closing small pores, thereby preventing penetration of the rhodium or iridium salts into such pores and resulting in a greater concentration of the metals on the exposed surface of the alumina. However, regardless of the particular effect of precalcination, it definitely has a beneficial effect upon the activity of the catalyst. Precalcination involves heating the alumina containing support at high temperatures, such as in excess of 1200°F in air for a number of hours, for example at temperatures in the range of 1200° to 2200°F for 1 to 10 hours.

When particle support forms are used, it appears advantageous that the support possess suitable macroporosity. Macropore-volume, as used herein, is defined as the pore volume from pores with pore diameter greater than 700 A as measured by mercury porosimetry. Apparently the presence of macropores as defined leads to more effective utilization of the interior of individual particles. Whatever, the reason for the increased efficiency through use of such supports, however, macropore volumes of about 0.2 cc/g yield more effective results with particle forms of the catalysts of the present invention. Less than 80 percent of the porosity is from pores of 700 A or less. After precalcination, the alumina supports may have surface areas less than 100 $m^2/gm$, and the use of such precalcined material is advantageous, although higher surface area supports are operative in the present invention. The surface area referred to is that determined by the BET method, i.e. Brunauer-Emmet-Teller. The particle sizes to be used with the catalysts of the present invention will depend upon factors including engine design, converter design and location. Generally speaking, particle sizes in the range of 4 mesh through 16 mesh appear useful.

Monolithic supports can be used to advantage with the rhodium and iridium containing catalysts of the present invention. Such monolithic supports consist of unitary refractory or ceramic structures characterized by a plurality of relatively thin-walled cellular channels passing from one surface to the opposite surface, thus providing a large amount of geometrical surface area. The channels can be of one or more of a variety of cross-sections selected from a variety of shapes and sizes, each space being confined by a ceramic wall. Cross sections of the support represent a repeating pattern which can be described as lattice, corrugated, honeycomb, etc.

The dimensions of a suitable monolithic carrier for use in the present invention will depend on many factors including position of use in the exhaust train. Positions closer to the engine will favor more rapid heat-up as a consequence of higher exhaust gas temperatures. Generally speaking, when used in the post-manifold position, the volume of each monolith will be between about 15 and 80 in.$^3$ and will have from about 8 to about 14 corrugations per inch. Wall thicknesses will be from about 0.005 to 0.015 inch thus creating an open area on the face of the monolith of about 50 to 70 percent.

The chemical composition of said monolithic supports can consist of $\alpha$-alumina, mullite, cordierite, spodumene, Zircon, Alundum, magnesium silicate, petalite, or combinations thereof, the refractory body being formed from these materials together with a suitable binder, such as clays, calcium carbonate, calcium aluminate, magnesium aluminate or combinations thereof. Generally, in the process of forming the rigid structure considerable porosity develops in the cell walls. For example, water absorptivities with $\beta$-spodumene monoliths may be 20 to 30 percent by weight.

As indicated previously, the refractory bodies will generally have an alumina coating deposited thereon. With the coating technique outlined hereinbefore with several different monoliths, the coating is uniformly distributed through the channels, and inside the cell walls. Pores are not blocked by the alumina coating. Coating thicknesses are on the order of 1 micron with a 5 percent alumina coating.

Alumina coatings on monoliths, when precalcined, will have surface areas in the range of about 50 to 200 m$^2$/g depending on precalcination temperature, when considered on the basis of alumina coating weight alone. A more preferred range of alumina coating surface area, after precalcination will ordinarily be less than 100 m$^2$/g. While the coating method outlined previously does not result in appreciable macroporosity, it is understood that suitable macroporosity can result through use of burn-out materials, inclusion of different powdered alumina types, etc.

It is further understood that other alumina starting materials can be utilized, for example De Gussa fumed alumina, Kaiser KCSA powder or others. An object in coating application is to provide an adhering coating which retains good contact with the underlying substrate through repeated exposures to high temperatures and in the presence of typical exhaust gas compositions.

The coating techniques and requirements are equally applicable to non-unitary, non-rigid substrates. Examples of such materials include the shapes and sizes herein specified for particle forms of alumina and furthermore include the chemical compositions herein enumerated with regard to monolithic structures.

The catalysts of the present invention, using the supports described herein, can be prepared in a variety of ways. Generally, the rhodium (iridium) component is added to the support, for example, by impregnation or by spraying from solutions of appropriate rhodium (iridium) compounds. Examples of rhodium compounds which can be used include the nitrate, halide, acetonyl-acetonate, or an appropriate rhodium carbonyl. An appropriate solvent is chosen depending on the compound chosen. Thus water solutions of $Rh(NO_3)_3$ suffice while benzene may be chosen for $Rh_4(CO)_{12}$.

With impregnation procedures, minimum solution techniques have certain advantages with the low levels of active utilized herein. Thus, if excess solution techniques are employed with aqueous solutions of $Rh(NO_3)_3$ or $RhCl_3$, selective adsorption an occur resulting in less control as to the amount of active deposited. The use of excess solution techniques, for example in adding rhodium to an alumina coated monolith, however, can be utilized so long as care is taken to account for selective adsorption. This generally can be accomplished simply by control of solution concentration and adsorption time.

The rhodium (iridium) addition step is generally followed by air drying to remove the bulk of solution. With aqueous solutions, temperatures in the range of 60° to 200°C can be employed, more preferably however, in the range of 80° to 150°C.

The rhodium compound is then decomposed by calcination at temperatures of about 250°C to 450°C. Air calcination generally suffices.

The noble metal component can then be reduced to the elemental state, for example in a 10 percent hydrogen stream at 300° to 500°C. Suitable inert diluents are nitrogen or helium.

It is to be understood that when reference is made herein to catalysts on an alumina support, that alumina coated ceramics or other materials are included as such alumina supports and that the alumina support can be in particle or monolithic form.

The examples to follow serve to illustrate important features of the present invention.

EXAMPLE 1

A 4536 gm amount of a 5 × 8 mesh activated alumina was impregnated with 4100 ml of solution containing 0.045 grams of Rh from $Rh(NO_3)_3$ via the minimum solution technique. The impregnation was accomplished by spraying the solution onto the alumina support which was continuously tumbled. The impregnated catalyst was then dried overnight at 120°C and after calcination in air at 450°C for 4 to 5 hours was reduced in a flow of 10% $H_2/N_2$ at 400° – 450°C for 3 to 4 hours. This catalyst gave a 50% $NO_x$ conversion temperature of 269°C at 10,000 hr$^{-1}$ in a stream containing 0.15% NO, 1% CO, 0.33% $H_2$ and about 3% $H_2O$ in nitrogen. The alumina used in this catalyst was an activated alumina having the following properties:

| | | |
|---|---|---|
| Physical form | — | 5 × 8 mesh spheres |
| % loss on ignition (1000°C) | — | 5.6 |
| Surface area (m$^2$/g) | — | 287 |
| Pore Volume (cc/g) | | |

|   |   |   |
|---|---|---|
| Total | — | 0.99 |
| 0–700 A | — | 0.73 |
| >700 A | — | 0.26 |
| Bulk density | — | 29.0 |
| XRD Phases | — | pseudo-gamma |

The gas mixture for testing the above catalyst was obtained by feeding the stated gases through calibrated capillaries into a mixing manifold which was held at constant pressure. The desired flow was then directed through a fritted disk water saturator and through a container of catalyst which was held at temperature with a furnace. The temperature was increased in small increments until the reaction started, and the temperature was determined at which 50 percent conversion of the nitrogen oxides occurred.

EXAMPLE 2

A rhodium containing catalyst was prepared on an alumina-coated monolith. The uncoated monolith sample is described below:

|   |   |   |
|---|---|---|
| Chemical composition | — | β-spodumene |
| Physical form: | | |
| Bulk density (gm/cc) | — | 0.5 |
| Surface area (m²/g)* | — | 0.2 |
| Channels-per-inch | — | 16 |
| Wall-thickness (mils) | — | ~12 |

*Nitrogen adsorption via BET

An alumina suspension was prepared by agitating a mixture of 5 grams Dispal M powder (obtained from Conoco) and 5 grams KCSA powder (obtained from Kaiser) in 200 ml of a 10% $HNO_3$-water solution. An 8.73 gram cylindrical piece of monolith was immersed in the suspension, removed, dried overnight at 120°C and calcined in air 5 hours at 500°C. The resulting alumina coating was 7.1 percent of the alumina-monolith weight.

The alumina coated monolith was then immersed in 30 ml of a rhodium nitrate solution containing 0.00317 g Rh. Excess solution was blown off with a nitrogen stream, and the monolith was dried overnight at 120°C prior to calcining in air at 500°C for 5 hours. The Rh-alumina-β-spodumene composite was then reduced in situ at 400°C with 1% CO - 0.33% $H_2$ in nitrogen prior to evaluation. The Rh loading was somewhat less than 0.003% by weight.

The test procedure outlined in Example 1 yielded a 50% $NO_x$ conversion temperature of 287°C.

EXAMPLE 3

A sample of an alumina coated monolith was used to prepare a rhodium-alumina-support composite. The uncoated monolith is described below.

|   |   |   |
|---|---|---|
| Chemical composition | — | cordierite |
| Physical form: | | |
| Bulk density (lbs/ft³) | — | 0.49 |
| Surface area (m²/gm) | — | 0.2 - 0.3 |
| Channels-per-inch | — | 12 |
| Wall thickness (mils) | — | 6 |

The alumina coating amounted to 4.3% weight of the alumina cordierite. The coated monolith was precalcined at 1500°F for about four hours, and then rhodium was added in accordance with the Example 2 procedure. The 50 percent nitrogen oxide conversion temperature was determined in accordance with the procedure described for Example 1, utilizing a feed of 0.15% NO, 1% CO, 0.33% $H_2$, and 3% $H_2O$ and a space velocity of 7500 hr$^{-1}$. The catalyst was then heated to a temperature at which it had good activity, and increments of oxygen were added with the inlet gas, causing a decrease in the percentage of nitrogen oxides being reduced and a decrease in the percentage of nitrogen oxides being reduced to ammonia. The oxygen concentrations at which these values equal 50% provide a basis for comparison of different catalysts, and are reported below along with the 50% $NO_x$ conversion temperatures. The catalyst was subjected to a series of cumulative 24-hour heat treatments in air at increasingly higher temperatures, as designated in the Table, and measurements were made after such treatment.

Table 1

| 24 hr. Treatment Temperature (°F) | 50% $NO_x$ Temperature (°C) | Oxygen at 50% $NO_x$ (%) | Oxygen at 50% $NH_3$ (%) |
|---|---|---|---|
| — | 253.9 | 0.797 | 0.250 |
| 900 | 246.8 | 0.912 | 0.244 |
| 1000 | 243.9 | 0.979 | 0.292 |
| 1100 | 248.0 | 1.000 | 0.281 |
| 1200 | 247.9 | 1.010 | 0.308 |
| 1300 | 257.8 | 1.101 | 0.318 |
| 1400 | 284.4 | 1.070 | 0.298 |
| 1500 | 329.5 | 1.017 | 0.208 |
| 1600 | 451.2 | .750 | .012 |

It will be noted that even after 8 days of heat treatment in air at temperatures finally reaching 1600°F, the catalyst still exhibited activity for $NO_x$ removal. This contrasts sharply with results with platinum catalysts, as platinum catalysts on monolith supports, at a 0.35 percent loading, have been found to undergo extensive deactivation (as $NO_x$ reduction catalysts) upon subjection to an air soak at 1200°F for 16 hours. The thermal instability of low levels of Pt is a serious drawback to using Pt at levels less than 0.1 percent even if one were willing to pay the activity penalty so incurred. The thermal stability of such low levels of Rh was not predictable from known Pt characteristics. Rhodium catalysts on beaded alumina supports are also resistant to deactivation. For example, a 0.001 percent by weight rhodium catalyst on an alumina precalcined at 1500°F had a 50% $NO_x$ conversion temperature of 484°C even after heating in air at 1600°F for 24 hours.

The $NH_3$ values in the foregoing procedure were determined by utilizing a second reactor containing a 0.5 percent platinum on alumina catalyst at 550°C – 600°C and with secondary air added between the two reactors to oxidize the ammonia to nitrogen oxide which was then measured and used to calculate the amount of ammonia in the effluent of the reactor containing the rhodium catalyst.

EXAMPLE 4

A sample of a different alumina coated monolith was used to prepare a rhodium-alumina support composite. The uncoated monolith is described below.

|   |   |   |
|---|---|---|
| Chemical composition | — | cordierite |
| Physical form: | | |
| Bulk density (g/cc) | — | 0.55 |
| Surface area (m²/g) | — | 0.2 - 0.3 |

| Channels-per-inch | — | 8 |
| Wall thickness (mil) | — | 9 |

The alumina coating amounted to 4.7 percent of the weight of the aluminacordierite.

Rhodium was then added to the coated monolith by the procedure of Example 2 to yield a composite containing 0.002 percent Rh by weight.

The activity of the catalytic composite of the present example was evaluated in accordance with procedures outlined in Example 3. Data for the as-prepared case and for the same sample heated 24 hours in air at each temperature are given in Table 2.

Table 2

| 24 hr. Treatment Temperature (°F) | 50% $NO_x$ Temperature (°C) | Oxygen at 50% $NO_x$ (%) | Oxygen at 50% $NH_3$ (%) |
| --- | --- | --- | --- |
| — | 247.9 | 0.716 | 0.292 |
| 900 | 242.1 | 0.769 | 0.269 |
| 1000 | 243.7 | 0.834 | 0.249 |
| 1100 | 249.8 | 0.897 | 0.266 |
| 1200 | 247.4 | 0.893 | 0.296 |

EXAMPLE 5

An alumina coated monolithic support such as in Example 4 was used, but with the rhodium loading being 0.01 percent. Test results were as follows:

Table 3

| 24 hr. Treatment Temperature (°F) | 50% $NO_x$ Temperature (°C) | Oxygen at 50% $NO_x$ (%) | Oxygen at 50% $NH_3$ (%) |
| --- | --- | --- | --- |
| — | 233.5 | 0.713 | 0.311 |
| 900 | 220.0 | 0.849 | 0.266 |
| 1000 | 227.5 | 0.896 | 0.205 |
| 1100 | 224.7 | 0.895 | 0.269 |
| 1200 | 228.7 | 0.883 | 0.294 |
| 1300 | 238.7 | 0.946 | 0.298 |
| 1400 | 258.2 | 0.925 | 0.321 |
| 1500 (42 hr.) | 366.2 | 0.665 | 0.066 |

EXAMPLE 6

The monolith type used in Example 4 was precalcined at 1500°F for several hours, and rhodium applied directly thereon in accordance with the procedure of Example 3, omitting the coating of activated alumina. The rhodium loading was 0.002 percent by weight. The 50% $NO_x$ conversion temperature was 274.2°C, and the oxygen level at 50% $NO_x$ conversion at constant temperature was 0.192 percent. A heat treatment at 900°F deactivated the catalyst so that a 50% $NO_x$ conversion could not be obtained at temperatures up to 600°C. The initial activity of this catalyst was lower than that of the catalyst of Example 4 with which it is comparable except for the presence of an $Al_2O_3$ coating. Also it is apparent that the uncoated sample has very poor thermal stability. It appears that the alumina secures the rhodium to the surface, preventing loss of active Rh surface at high temperatures, but the advantages of the alumina coating are apparent, regardless of what the particular mechanism may be.

EXAMPLE 7

Specimens of an alumina coated monolithic support such as used in Example 3 were provided with various rhodium loadings, either after a precalcination treatment (at 1500°F for 24 hours), or without precalcination. The 50% nitrogen oxide conversion temperature was determined utilizing the same feed stream as Example 3, with the following results.

Table 4

| | 50% $NO_x$ Temp. (°C) | |
| --- | --- | --- |
| Wt. % Rh | Not Precalcined | Precalcined |
| 0.04 | 230.5 | 211.5 |
| 0.01 | 268.2 | 228.1 |
| 0.0025 | 281.1 | 254.4 |

Precalcining the support produced an improvement of 20 to 40 centigrade degrees in 50 percent-Temperature for $NO_x$-conversion.

EXAMPLE 8

The spherical alumina employed in the following example had the following properties:

| | | |
| --- | --- | --- |
| Physical Form | — | 5 × 8 mesh spheres |
| Wt. % loi (1000°C) | — | 8.7 |
| Surface area (m²/g) | — | 330 |
| Pore volume (cc/g) | | |
| Total | — | 0.80 |
| ≤ 700 A radii | — | 0.58 |
| >700 A | — | 0.22 |
| Bulk density (lbs/ft³) | — | 32 |
| XRD Phases | — | pseudo-gamma |

A 25 gram amount of the activated alumina was impregnated with 20 ml of a rhodium trichloride solution containing 0.00025 gm rhodium. The impregnate was dried at 120°C overnight, calcined in air at 450°C for 4 hours, and reduced in a 10% $H_2$ in helium stream at 400°C for 2 hours. The resulting catalyst had a rhodium loading of 0.001 percent by weight. Another sample of the same alumina was similarly impregnated and treated, but employed a solution of $Rh(NO_3)_2·2H_2O$.

In another procedure to provide halide ion in the catalyst, a 30 gram sample of the same alumina was impregnated with 24 ml of solution containing 0.735 gram $NH_4Br$. The impregnated alumina was dried overnight at 120°C and calcined in air at 450°C for 4 hours. The impregnated alumina was then impregnated with rhodium from rhodium nitrate solution as described above, giving a catalyst with 0.001 percent by weight rhodium and 2% by weight bromine. Similar catalysts were prepared by the same procedure, but with varying amounts of oxygen in the feed stream.

The data in Table 5 was obtained by passing a feed gas containing nitric oxide over a heated catalyst bed at a space velocity of 10,000 $hr^{-1}$. The feed gas had a 0.15% NO content, 1.0% CO, 0.5% $H_2$, and the balance nitrogen with varying amounts of oxygen between zero and 1.5 percent. The temperatures employed were temperatures between 350° and 550°C at which the catalysts had good activity. Ammonia was measured by passing the effluent through a 10 meter infrared cell in a spectrophotometer (Perkin - Elmer 337). The CO was measured using a non-dispersive infrared instrument, and the $NO_x$ was analyzed using an electrochemical cell analyzer operating on the principle of a fuel cell (Dynasciences NX-130 analyzer). The oxygen levels were measured with an oxygen meter (Beckman E2). Plots of $NH_3$-in-effluent and $NO_x$ removal vs. oxygen in the feed were then constructed.

Results are reported below, along with those of some comparison catalysts. The percentage $O_2$ at 90% $NO_x$ conversion shows the maximum amount of oxygen which can be present while 90 percent removal of the $NO_x$ is achieved. The percentage $O_2$ at 100 ppm $NH_3$ in the effluent shows the amount of oxygen needed to control $NH_3$ production to less than 100 ppm in the effluent gas. The $\Delta$ % $O_2$ (when a positive number) indicates the range of oxygen contents at which operation between the described limits can be achieved. The larger the value of $\Delta$ % $O_2$, the better the result, as less rigid control of exhaust gas stoichiometries is required. It will be noted that the test temperatures here are generally below those to be attained in an automotive $NO_x$ converter, and that higher temperatures would result in less ammonia generation.

such catalysts were prepared on a beaded activated alumina such as that employed in Example 1. The feed stream consisted of 0.15% NO, 1.0% CO, 0.3% $H_2$ and ~3.0% $H_2O$ in a $N_2$ diluent. The space velocity in each case was 10,000 $hr^{-1}$. The temperature at which 50 percent conversion of $NO_x$ was observed is taken as a measure of catalyst activity and the results are recorded in Table 6.

Table 6

| Catalyst | $NO_x$ 50% Temp.(C°) |
|---|---|
| 0.001% $Rh/Al_2O_3$ | 288 |
| 0.001% $Pd/Al_2O_3$ | 343 |
| 0.002% $Ir/Al_2O_3$ | 488 |
| 0.002% $Pt/Al_2O_3$ | 560 |
| 0.002% $Ru/Al_2O_3$ | 600 |

The 50% temperature of the Pt catalyst is just about the operating temperature which one can expect for a Table 5

| Catalyst | Halide Content | % $O_2$ at 90% $NO_x$ | % $O_2$ at 100 ppm $NH_3$ | $\Delta$% $O_2$ |
|---|---|---|---|---|
| 5% Cu, 3.4% Cr on $Al_2O_3$ | — | 0.66 | 0.70 | −0.04 |
| 0.05% Pt on $Al_2O_3$ | — | 0.40 | 0.70 | −0.30 |
| 0.005% Rh on $Al_2O_3$ | — | 0.64 | 0.51 | +0.13 |
| 0.001% Rh on $Al_2O_3$ | — | 0.62 | 0.58 | +0.04 |
| 0.001% Rh on $Al_2O_3$ | from $RhCl_3$ | 0.85 | 0.44 | +0.41 |
| 0.001% Rh on $Al_2O_3$ | 1% Br | 0.79 | 0.50 | +0.29 |
| 0.001% Rh on $Al_2O_3$ | 2% Br | 0.81 | 0.44 | +0.37 |
| 0.001% Rh on $Al_2O_3$ | 4% Br | 0.90 | 0.46 | +0.44 |
| 0.001% Rh on zirconium silicate | — | 0.60 | 0.86 | −0.26 |

It can be seen from the results that rhodium in low concentrations is both active and selective toward desired reduction of nitrogen oxide, being more selective than comparison catalysts. Halide ion is also shown to be beneficial to selectivity. Numerical values will vary with particular test conditions and limits selected, but the data show the superior selectivity of rhodium, particularly when halide is also present. The control of ammonia in the effluent will be particularly significant if the catalyst is employed in an embodiment where there is either no subsequent treatment to remove ammonia, or where a subsequent oxidation reaction is conducted under temperature conditions which causes oxidation of ammonia to objectionable nitrogen oxides. Halide ions in general are useful along with rhodium to promote the selectivity of the catalysts of the present invention. The iodides, bromides, chlorides, fluorides, or mixtures thereof can be used along with the small amounts of rhodium, and the halide can be added along with or separately from the rhodium or iridium. Halide can be employed, for example, in amounts from 0.001 to 10 percent or more of the catalyst composite, but only small amounts are needed. The bromide ion is preferably used.

EXAMPLE 9

In an effort to establish the relative activities of the various noble metals at very low loadings a series of catalyst bed in a post-manifold position which indicates that the 0.002% $Pt/Al_2O_3$ catalyst lacks sufficient activity. On the other hand, Rh at a comparable loading has more than sufficient activity to be useful. Palladium also has surprising $NO_x$ activity at this low loading especially since at 0.5 percent loadings the $NO_x$ activity series was found to be Rh>Ir>Pt~Ru>Pd whereas at these low loadings the $NO_x$ activity sequence is Rh>Pd>Ir>Pt>>Ru. Were it not for the severe thermal stability problems expected with low $Pd/Al_2O_3$ catalysts, they would also be prime candidates for $NO_x$ removal applications. The data in Table 6 again illustrates the surprisingly good activity of low loadings of Rh on $Al_2O_3$.

EXAMPLE 10

In this procedure, a dual bed system was employed to reduce the nitrogen oxides and to oxidize the oxidizable gas components in a simulation of one of the invention embodiments discussed earlier. Reactor No. 1 ($NO_x$ reduction reactor) contained 10 cc of the 0.001% $Rh/Al_2O_3$ catalyst prepared in Example 2. Reactor No. 2 (oxidation reactor) contained 10 cc of a typical oxidation catalyst such as 5% Cu, 3.4 percent $Cr/Al_2O_3$. The furnaces for both reactors were set at 350°C. The feed stream contained 0.15% No, 1.0% CO, and 0.5% $H_2$ with balance $N_2$, oxygen being added in amounts varying between 0 and 1 percent. Secondary air was injected between the two reactors in amounts sufficient to insure that at least 2.5 percent $O_2$ was present in the stream as the gases entered the second reactor.

By monitoring the $NH_3$ level with a 10 meter gas cell in an infrared spectrometer (Perkin Elmer 337), it was found that up to 90 percent of the NO entering reactor No. 1 was converted to $NH_3$ when no $O_2$ was present. However, if the second reactor bed was maintained within a temperature range from 350° to 425°C, no more than 20 ppm $NH_3$ was observed in the effluent from the whole system. Thus by operating the second reactor with the proper oxygen level and in the described temperature range, it is possible to control the ammonia emission at a negligible level. The occurrence of temperatures in excess of 425°C for appreciable times is to be avoided, as such temperatures cause the ammonia to be oxidized to NO or $NO_2$, rather than to $N_2$ and $N_2O$.

A plot of the percent $NO_x$ conversion vs. percent oxygen (in the first reactor) in the foregoing procedure indicated the presence of the second reactor did not have much effect on the $NO_x$ conversion, the $NO_x$ conversion being very slightly higher for the single reactor, as the conversions held to about 95 percent at oxygen levels up to 0.6% $O_2$ and then dropped to about 50 percent at slightly over 0.9 percent oxygen. The ammonia values for the single reactor were originally at about 1300 ppm and dropped to about 200 ppm at 0.5% oxygen and to less than 20 ppm around 0.7% oxygen. With the second reactor present, the ammonia values were less than 20 ppm, regardless of the oxygen content over the 0 to 1% range monitored for the first reactor.

The foregoing example illustrates one useful way of practicing the present invention. In the procedure, the first reactor is operated under the general conditions taught herein, i.e., under reducing conditions with a rich air to fuel ratio to achieve the $NO_x$ reduction, and the second reactor is then operated under oxidizing conditions, with a suitable oxidation catalyst, to oxidize hydrocarbons, carbon monoxide, ammonia and any other oxidizable components, at temperatures sufficient to achieve such oxidation, but not sufficient to cause appreciable oxidation of ammonia to $NO_x$. Additional air is added to the gases after the first reactor to provide oxidizing conditions in the second reactor, at least 2 to 2.5 percent by volume of oxygen in the second reactor usually being sufficient. The temperatures in the second reactor on the average will not exceed about 425°C, although there may occasionally be transient temperatures which are higher. Desirable temperatures will vary somewhat with the particular oxidation catalyst, but should not exceed values which cause extensive oxidation of ammonia to NO or $NO_2$, when the first reactor is operated under conditions which produce substantial amounts of ammonia. It is desirable to operate the second reactor under conditions where the catalyst activity is good, and temperatures of 350°C are generally sufficient to have good oxidation catalyst activity. The temperatures employed for the first reactor will generally be higher than those illustrated in the foregoing example.

It is practical to locate the present rhodium catalyst close to the engine where the exhaust gases are very hot, since the catalyst has good high temperature stability. This has the effect of increasing the activity of the catalyst, and permitting the use of a smaller amount of catalyst. The use of smaller amounts of catalyst is advantageous in that a smaller or thinner catalyst bed provides less of a heat sink, thereby permitting the oxidation catalyst in the second reactor to be heated more rapidly and minimize emissions from a cold start of the engine. The rhodium catalyst is reactive at relatively low temperatures and the $NO_x$ reactor can be operated at temperatures of say from 600°F on up, but is preferably operated at average temperatures from at least 900°F up to 1100° or 1200°F or higher, although not generally exceeding 1500°F except for transient temperatures.

EXAMPLE 11

Two cylindrical pieces (3 inch long × 4 inch diameter) of Corning Cercor 9692 (β-spodumene) were coated with Dispal M alumina in accordance with the teachings contained in the specifications hereinbefore to give a 4 percent by weight alumina coating. After calcination for 5 hours at 930°F followed by 5 hours at 1600°F, the samples were impregnated with Rh $(NO_3)_3$ solution to give a nominal rhodium loading of 0.0025 percent. The catalysts were then calcined at 840°F for 3 hours in air and reduced in a 300 cc/min. stream of 30 percent $H_2$/He at 660°F for 2 to 3 hours. These samples were then mounted in the post manifold position of a 1971 Chevrolet with a 350 CID, V8 engine. The samples were 6 to 8 inches from the exhaust manifold itself. An HEW constant volume sampling test as described in the Federal Register V 35 No. 219, pages 17288-17312 was then run on the vehicle. During the test the peak temperature observed in the catalyst bed was 1180°F with the average over the whole testing being around 960°F. The $NO_x$ emissions from the vehicle were 0.19 gm/mile which is considerably better than the 0.40 gm/mile standard adopted by the Environmental Protection Agency on June 30, 1971 for all 1976 model year automobiles. This test clearly illustrates the potential practicality of the catalyst when it is realized that this system on a ten million car-per-year basis will use less than 8 percent of the estimated annual free world production of rhodium which is not a prohibitive increase in demand.

EXAMPLE 12

The oxidation capabilities of the low Rh catalysts were shown in a transient test designed to simulate the cold start procedure used for testing vehicle emissions. In this test samples of equal volume were rapidly heated from 50°C to 650°C at a rate of about 200 cc/min. with feed gases typical of those used in previous examples. The effluent concentrations were integrated over the first four minutes of the run and the percent remaining of each pollutant was taken as a measure of catalyst performance. In effect, the test simulates the critical first four minutes of the Federally prescribed CVS test, for catalysts in the post manifold position. The values in the following table show that the low rhodium catalysts are quite active for CO and hydrocarbon oxidation. The lower the value, the more effective the catalyst. It will be noted that by this test the 0.001 percent Rh catalyst is possibly even somewhat better than what is considered to be a very good oxidation catalyst i.e. the 5 percent Cu, 3.4 percent $Cr/Al_2O_3$ catalyst. This suggests that low $Rh/Al_2O_3$ catalysts will be useful in either or both reactors of a dual bed system.

Table 7

| Catalyst* | % Remaining | |
|---|---|---|
| | HC | CO |
| 5% Cu, 3.4% Cr/Al$_2$O$_3$ | 37 | 29 |
| .00025% Rh/(β-spodumene monolith containing 4.8% Al$_2$O$_3$ coating) | 46 | 31 |
| .001% Rh/(β-spodumene monolith containing 4.8% Al$_2$O$_3$ coating) | 31 | 26 |

*Bulk densities of all catalysts are about 35 lbs/ft$^3$.
Feed composition: 1.6% CO, 2.5% O$_2$, 0.05% C$_3$H$_6$ and ~2.1% H$_2$O in N$_2$
Space Velocity: 40,000 hr$^{-1}$ As indicated hereinabove, in one aspect of the invention it will be desirable to operate the automobile engine richer than needed, and to add supplemental air to the exhaust prior to contacting the catalyst to obtain proper oxygen content. Operation in this way with a rhodium catalyst has several advantages. The main advantages are that it widens the range of air-to-fuel ratios over which specified levels of NO$_x$ control can be attained and improves the degree of NO$_x$ control. Because of the marked advantage flowing directly from the addition of the supplemental air, it can conveniently be termed "bootstrap air," and that term is utilized herein to designate air added to the exhaust stream in advance of the NO$_x$ converter. A mode of operation involving a rich-air to-fuel ratio and bootstrap air will be referred to herein as a "bootstrap operation" or mode of operation. Discussion herein with respect to the bootstrap mode of operation is specifically applicable to rhodium catalyst, regardless of whether rhodium is specifically mentioned.

The purpose of the bootstrap air is to provide the proper exhaust gas mixture for NO$_x$ reduction without producing excessive amounts of ammonia. The effectiveness of a system in removing NO$_x$, considering both NO$_x$ reduction and ammonia production, can be summarized by taking, on a molecular basis, the sum of NO and NH$_3$ remaining, as a percentage of the original NO present. For convenience this percentage is sometimes designated herein by the Greek letter Omega, Ω. The bootstrap mode of operation with rhodium catalyst causes Ω to remain at low levels over a larger range of air-to-fuel ratios. This is illustrated in FIG. 1, which is described in further detail in Example 14.

Air-to-fuel ratios have a significant bearing on the efficiency of the operation of an automobile engine, and also on the composition of the resulting exhaust gases. Such ratios can be reported in terms of percentages of air with respect to stoichiometric, but are commonly referred to as an A/F ratio and reported on a weight basis, e.g. pounds of air per pound of fuel, with the relationship of the A/F ratio to the stoichiometric point being particularly significant. The stoichiometric point may vary somewhat, but is generally around 14.7 pounds air per pound of fuel for gasolines used in automobiles. The A/F ratio can be reported as a Δ A/F, indicating by how many A/F units it differs from stoichiometric, with units on the rich side of stoichiometric being reported as − Δ A/F. an automobile engine has to be adaptable to various driving conditions in the normal course of operations; because of this and other factors, carburetors are ordinarily set to operate over a specified range of A/F ratios. Presently proposed carburetion control may involve an A/F carburetion range which is one A/F unit wide, but more precise carburetion controls may make it feasible to operate over a range which is only 0.5 A/F unit wide, or some other more limited range. The presently described bootstrap operation makes it possible to improve results, i.e. lower Ω, particularly at the rich side of an operating range, and is therefore useful with the kind of carburetion contemplated for automobile engines. The bootstrap mode of operation can be used with any of the rhodium catalysts described herein, including those with amounts of rhodium up to 0.1% or more, but there may be advantage in its use with low rhodium catalysts, such as catalysts containing less than 0.005% rhodium.

As taught herein, the ammonia production varies with the ratio of oxidizable components to oxygen. Carbon monoxide and hydrogen are the principal oxidizable components to be considered. It appears that the ratio of hydrogen to oxygen is the most significant parameter with respect to ammonia production. A possible explanation of the efect of bootstrap air is that the added oxygen selectively reacts with the hydrogen (rather than CO) so that the reaction mixture is lower in hydrogen. However, regardless of the particular mecanism, it is clear that the bootstrap operation has the desired effect of permitting high NO$_x$ reduction with low ammonia production. It happens that the ratio of CO to H$_2$ in automotive exhaust is ordinarily fairly constant, e.g. usually in the range of about 3.0 to 3.5 and quite often about 3.2. Therefore the relationships involved between oxidizable components and oxygen can conveniently be stated in terms of CO/O$_2$ ratio. The desirable CO/O$_2$ ratios in a bootstrap operation will depend upon the intended Ω levels, and may vary with the particular rhodium catalyst or other factors, but will usually be in the range of 1.5 to 5 on a molecular basis or more preferably 1.5 to 3 or 4. Even so, the use of bootstrap operation ordinarily gives some improvement in results even if the CO/O$_2$ ratio ranges as high as 10 or 20 or more in certain phases of the operation.

It appears that the percent of CO in automotive exhaust increases rapidly and substantially linearly with increasing richness of the A/F ratio on the rich side of stoichiometric. Moreover, this is accompanied by some decrease in oxygen content. Thus the CO/O$_2$ ratio ordinarily rises rapidly with the richness of the feed. The addition of bootstrap air serves to moderate this effect. With a larger amount of oxygen present, increases in the CO do not have as great an effect upon the CO/O$_2$ ratio. The result is that the CO/O$_2$ ratio stays at a lower level, and consequently Ω also remains at low levels over a larger range of air-to-fuel ratios as illustrated in FIG. 1.

Automobiles as now designed operate over a range of air-to-fuel ratios, rather than on a particular point, with a range of 1.0 A/F unit being proposed for automobile models of the near future by engineers of a prominent automobile manufacturer. It is desirable to operate solely on the rich side of stoichiometric, since it is not feasible to reduce nitrogen oxides on the lean side of stoichiometric, and substantial operation there will result in substantial discharge of nitrogen oxides into the atmosphere. It follows that operation of an automobile in the contemplated manner will ordinarily involve some operation ranging at least as far on the rich side of stoichiometric as − Δ 1.0 A/F. However operation at − Δ 1.0 A/F, i.e. about 13.7 A/F, would not ordinarily provide sufficient oxygen to prevent substantial ammonia production, but additional oxygen would have to be added. Yet, if the rich edge of the A/F range were at −1.0 A/F, then the lean edge of a 1 unit wide A/F range would be right at the stoichiometric point and no oxygen could be added (assuming constant percentage addition of oxygen) without providing an excess of oxygen at the lean edge of the operating range and thereby preventing reduction. Therefore in operating under rich conditions for bootstrap operation, even the lean edge is ordinarily on the rich side of stoichiometric by at least a small increment. In the foregoing discussion and unless otherwise specified herein, A/F ratio refers to carburetion and does not take into account the amount of bootstrap air added to the exhaust gases.

If bootstrap air is utilized, the amount added will depend upon the results desired, for example an amount can be added sufficient to permit $\Omega$ to be no higher than 20 percent at the most in the designated operating range, and preferably no higher than 10 percent. As taught herein, the $CO/O_2$ ratio is indicative of the $\Omega$ levels to be obtained. If a particular width of A/F carburetion range is specified, along with the error factor on the control of bootstrap air addition and with known variation in CO and $O_2$ with A/F ratios, it is possible to determine the maximum $CO/O_2$ ratio that can occur with a particular percentage bootstrap air addition used to the best advantage under the specified conditions. Thus the percentage of bootstrap air can be selected to control the $CO/O_2$ ratio at or below a desired level, e.g. 5, 4 or 3. The carburetion range can then be selected so that the lean edge is sufficiently on the rich side that the bootstrap air will place it at or slightly on the rich side of stoichiometric. For example, with ± 20 percent error in the bootstrap air control a 4.3% bootstrap air addition will indicate selection of a carburetion lean edge at about −Δ 0.7 A/F. Similarly, 3 percent bootstrap air will call for about −Δ 0.5 A/F on the lean edge and 6 percent bootstrap air, for about −Δ 0.9 A/F on the lean edge.

Ordinarily, for reasons of fuel economy it will be desirable to have the A/F ratio no richer than necessary to insure against nonoxidizing conditions after addition of the bootstrap air, i.e. to have the amount of added air approach the maximum which can be added without making the conditions oxidizing on the lean edge of the A/F range. Of course some of the advantages of the bootstrap operation will be obtained even if the A/F range is richer than necessary. However, in most cases the percent of bootstrap air will approach and be within 20 percent or so of the maximum which can be added without making the conditions oxidizing on the lean edge. In general the proper combination of percent of bootstrap air and A/F range should be selected to keep the $CO/O_2$ ratio in a selected range, e.g. 1.5 to 4 or 5.

When bootstrap air is utilized, the percentage employed can vary over wide ranges with desirable effects, e.g., 0.5 to 25 percent of the exhaust rate. As illustrated herein, larger amounts of bootstrap air tend to have a greater effect. However, large amounts also require a richer A/F ratio and therefore adversely affect fuel economics. Therefore the advantages must be balanced against the economic considerations. Thus a more practical range for operation is 2 to 10 percent bootstrap air, and amounts in the range of 3 to 6 percent are generally preferred. It will be understood that for bootstrap operations all of the foregoing ranges will be used with A/F ratios which are sufficiently on the rich side of stoichiometric to avoid oxidizing conditions, in accordance with the teaching herein.

In description of the effects of bootstrap operation herein, particular attention has been devoted to worst case conditions, as customary in engineering design practice. However it should be recognized that the $\Omega$ level will vary over the operating range, and that it may possible be feasible to select the carburetion richness and bootstrap air rate to obtain desired average levels of $\Omega$, even though the maximum level of $\Omega$ be higher than that ordinarily considered acceptable. Moreover, much of the discussion herein relates to continuous addition of air, for example, addition of a constant percent of the exhaust stream. However, the addition rate could be varied, for example adding large amounts of air to exhaust during rich carburetion, and adding lesser or no amounts of air when the carburetion is less rich, and such variants are to be considered within the bootstrap operation described herein.

Figure 2:
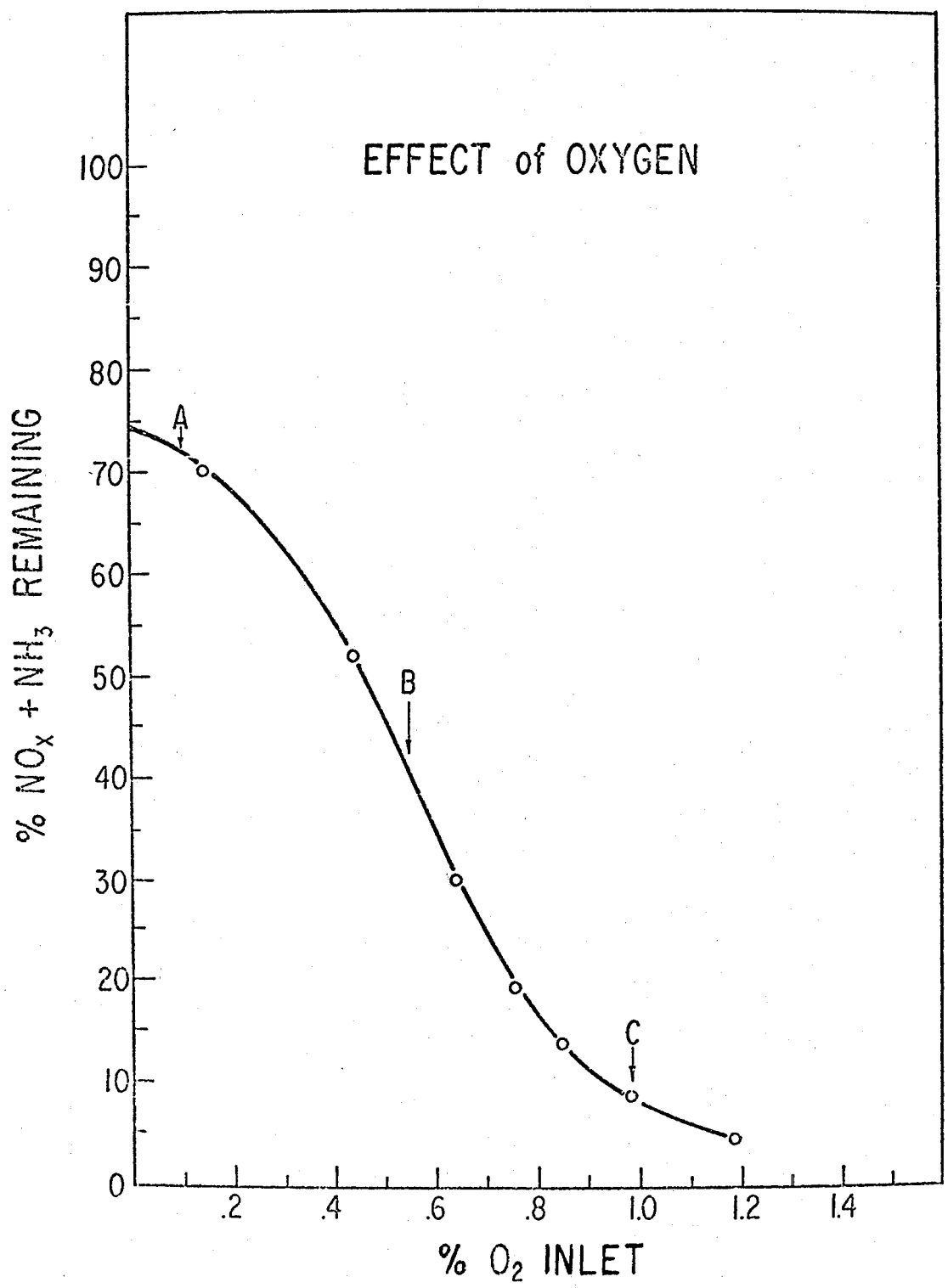

The effect of adding oxygen is further illustrated graphically in FIG. 2. In the figure the percent of $NH_3$ + $NO_x$ is plotted against the percent of added oxygen. Particular points marked on the graph are: A, where no additional oxygen was added; B where the oxygen was sufficient to consume the $H_2$ in the feed; and C, where the oxygen was equivalent to 4.3 percent air. The data for the figure was obtained utilizing a rhodium on monolith catalyst at 600°C, and 80,000 $hr^{-1}$, with a gas stream containing 3.5% CO and 0.1% $O_2$ or other indicated percentages of $O_2$, and with $H_2$ in an amount to make the $CO/H_2$ ratio 3.2/1.

EXAMPLE 13

An uncoated monolith as described in Example 2 was utilized to prepare a rhodium catalyst on an alumina-coated monolith. An alumina suspension was prepared by agitating a mixture of 5 grams Dispal M alumina powder and 5 grams KCSA alumina powder in a 200 ml of a 10% $HNO_3$ - water solution. A 3ml cylindrical piece of monolith was immersed in the suspension, removed, dried overnight at 120°C and calcined in air 5 hours at 500°C. The resulting alumina coating was 5 percent of the alumina-monolith weight.

The alumina coated monolith was then immersed in 5 ml of a rhodium nitrate solution containing 0.00045 g Rh. Excess solution was blown off with a nitrogen stream, and the monolith was dried overnight at 120°C, prior to calcining in air at 500°C for 5 hours. The Rh-alumina-$\beta$- spodumene composite was then reduced in situ at 400°C with 1% CO-0.33% $H_2$ in nitrogen prior to evaluation. The actual Rh loading was 0.0025% by weight.

The rhodium monolith was tested for $NO_x$ conversion in both conventional and the bootstrap mode of operation. An 80,000 hr −1 space velocity was used with a gas stream containing 10% $H_2O$, 10 percent $CO_2$, 21 ppm $SO_2$, 1200 ppm NO, 250 ppm hexane, amounts of CO, oxygen and hydrogen corresponding to indicated A/F ratios, and the balance nitrogen. The $CO/H_2$ ratio was set at 3.2. Assuming carburetion over a 1.0 A/F range, in conventional operation this is −1.0 to 0 Δ A/F. A bootstrap air rate of 4.3 percent was selected as appropriate and employed with a range of −1.7 to −0.7 Δ A/F for bootstrap operation. Results were as follows:

Table 8

| Mode | Inlet Temp. (°C) | Cat. Temp. (°C) | $\Omega$ at rich edge | $\Omega$ at lean edge |
|---|---|---|---|---|
| Conventional | 600 | 605 | 57 | 4 |
| Bootstrap | 600 | 650 | 13 | 2 |
| Bootstrap | 550 | 605 | 17 | 2 |

The benefit of bootstraping shown in the table is much greater than would be expected from the temperature rise associated with the combustion of the bootstrap oxygen. In the above tests, in the conventional mode the gas stream contained 3.28% CO and 0.12 $O_2$ at the rich edge, and 0.79% CO and 0.51% $O_2$ at the lean edge; in the bootstrap mode after addition of the air the stream contained 4.04% CO and 0.98% $O_2$ at the rich edge, and 1.82% CO and 1.18% $O_2$ at the lean edge. Since in contemplated useage carburetors do operate over a range of A/F ratios the results under the worst conditions encountered in the range are significant, and the difference between an $\Omega$ of 57 in the conventional mode and 13 from the bootstrap operation illustrates the marked improvement from the bootstrap operation. As reported above, the test gas used here contained water and $SO_2$ at specified levels which have significance in that they are relevant to levels likely to be encountered in actual automobile exhaust gases. Since these components are known to frequently poison or decrease the oxygen tolerance of catalysts, it is significant that the present procedures can successfully be accomplished with such materials present.

EXAMPLE 14

The rhodium monolith described in Example 13 was utilized to measure $\Omega$ with and without bootstrap air addition. The tests were conducted at 80,000 $hr^{-1}$ in a 600°C furnace. Gas mixtures were prepared to correspond to various air-to-fuel ratios with no bootstrap air, and utilized in the test procedures. Other mixtures were prepared in which 4.3 percent of the mixture was air added in addition to that characteristic of a designated air-to-fuel ratio. The results at 4.3 percent bootstrap air were much better than those with no bootstrap air, particularly with increasing richness of the A/F ratio. These results were graphed in FIG. 1. In the graph the effective $\Delta$ A/F is measured on the abscissa and the % of $NH_3$ and $NO_x$ remaining on the ordinate. "Effective $\Delta$ A/F" is utilized in the figure in order to start the 4.3 percent bootstrap graph at the same zero point as the no bootstrap air graph for comparison purposes; i.e. in effect, the 4.3 percent bootstrap graph is shifted 0.5 $\Delta$ A/F unit to the right, in order to have the stoichiometric point at zero rather than at 0.5 A/F. It is readily apparent that the bootstrap air permits operation over a broader range of A/F ratio with acceptably low levels of pollutants remaining. In essence this widens the air-to-fuel window in which operations are possible to achieve a stated level of control of pollutants from $NO_x$. Larger amounts of added air than illustrated would make the window even wider. Of course the larger the amount of bootstrap air, the greater the adverse effect upon fuel economics because of increasing richness of the carburetor feed, and this and other aspects of rich carburetor feed must be considered in appraising the relative advantages and disadvantages of particular percentages of bootstrap air. The significance of a wider $\Delta$ A/F window can further be appreciated by reference to Example 13 above where poor results were obtained at the rich edge in a conventional procedure.

EXAMPLE 15

Figure 3:
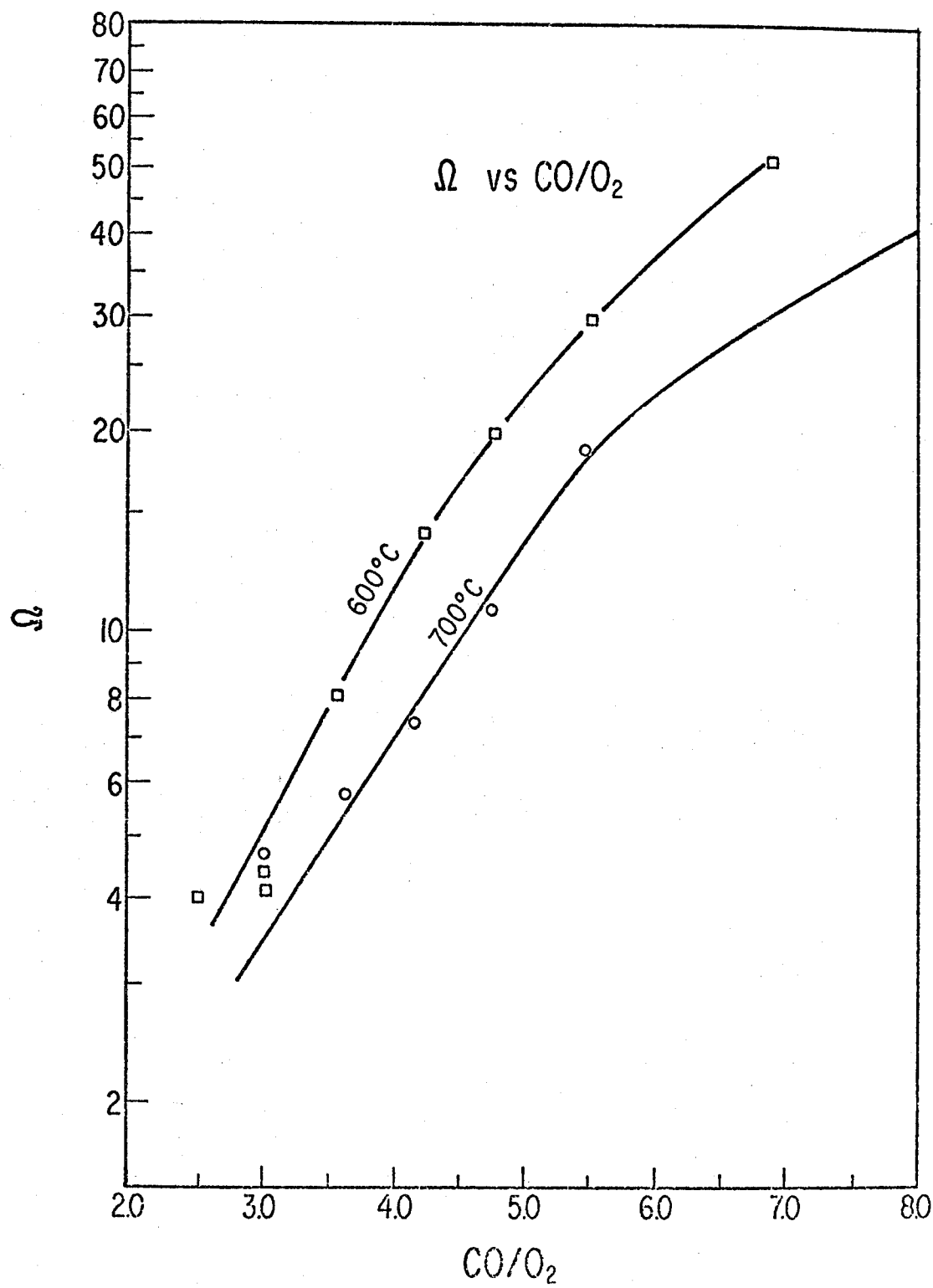

The rhodium on an alumina coated monolith described in Example 13 was utilized to measure the variation in $\Omega$ with variation in the $CO/O_2$ ratio in the $NO_x$ containing gas. The gas and flow rate conditions were as described in Example 13 except that the oxygen content was varied to provide different $CO/O_2$ ratios. The results at 600°C and 700°C are graphed in FIG. 3, with $\Omega$ on the ordinate and $CO/O_2$ on the abscissa. The results show the advantage of operating at relatively low $CO/O_2$ ratios, although the upper limit depends upon which $\Omega$ levels are considered acceptable. Operation at $CO/O_2$ levels no greater than 3 would be advantageous if feasible, while it is possible to have $\Omega$ of about the 10 percent level or lower by not exceeding a $CO/O_2$ of 4, while somewhat higher levels of $\Omega$ are obtained if the $CO/O_2$ ratio reaches levels of 5 or so. As is apparent from the graph, the temperature has an effect upon $\Omega$, and this must be considered along with efficiency of the particular catalyst, flow rate of the gases, etc., in determining the desirable ranges in the amount of bootstrap air. While not specifically illustrated in FIG. 3, in general 1.5 will be considered the lower limit of the desirable $CO/O_2$ ranges, as excess oxygen can prevent reduction of the $NO_x$.

The interactions and relationships between the various factors involved in the bootstrap operation can be further understood from the following calculations:

Let $K_1$ = width of $\Delta$ A/F window due to carburetor error
$K_2$ = % bootstrap air (nominal)
$K_3$ = error factor on bootstrap air with the lean edge (after bootstrap addition) at true stoichiometric:

% $O_2$ - (lean) = 0.3 + 0.209 $K_2 K_3$
limit % CO (lean) = 1.5 (0.3 + 0.209 $K_2 K_3$)
  = 0.45 + 0.313 $K_2 K_3$
% CO (rich edge) = 0.45 + 0.313 $K_2 K_3$ + 2.2 $K_1$ $$\% O_2 \text{ (rich edge)} = 0.1 + \frac{0.209 K_2}{K_3}$$

$$(CO/O_2) \text{ max} = \frac{0.45 + 0.313 K_2 K_3 + 2.2 K_1}{0.1 + \frac{0.209 K_2}{K_3}}$$

For further illustration, the maximum $CO/O_2$ ratios are reported below for particular conditions and percentages of bootstrap air, Table 9

| $K_2$ | A<br>$K_1 = 1.0$,<br>$K_3 = 1.2$,<br>$(CO/O_2)$ max | B<br>$K_1 = 1.0$,<br>$K_3 = 1.0$,<br>$(CO/O_2)$ max. | C<br>$K_1 = 0.5$,<br>$K_3 = 1.2$,<br>$(CO/O_2)$ max. | D<br>$K_1 = 0.5$<br>$K_3 = 1.0$<br>$(CO/O_2)$ max. |
|---|---|---|---|---|
| 0.1 | 23 | 22.1 | 13.5 | 13.0 |
| 0.5 |  |  |  | 8.1 |
| 1.0 | 11.1 | 9.6 | 7.07 | 6.02 |

Table 9 — Continued

| $K_2$ | A<br>$K_1 = 1.0$,<br>$K_3 = 1.2$,<br>$(CO/O_2)$ max | B<br>$K_1 = 1.0$,<br>$K_3 = 1.0$,<br>$(CO/O_2)$ max | C<br>$K_1 = 0.5$,<br>$K_3 = 1.2$,<br>$(CO/O_2)$ max | D<br>$K_1 = 0.5$<br>$K_3 = 1.0$<br>$(CO/O_2)$ max |
|---|---|---|---|---|
| 3.0 | 6.07 | | 4.31 | |
| 5.0 | 4.66 | 5.25 | | |
| 10.0 | 3.48 | 2.69 | 2.88 | 2.2 |

Curves can be constructed from the above data. Using performance data obtained for a rhodium on alumina coated monolith at 700° C, and 80,000–90,000 hr$^{-1}$, the maximum amounts of $\Omega$ at various percentages of bootstrap air can then be calculated with results as illustrated below:

Table 10

| | $\Omega$ max. at % Bootstrap air | | | |
|---|---|---|---|---|
| Conditions | 0 % | 2.5% | 4.3% | 7 % |
| A | 50 | 29 | 13 | 7 |
| B | 40 | 20 | 8 | 5 |
| C | 50 | 10 | 6 | 5 |
| D | 40 | 6 | 4 | 3 |
| Avg. Economy Loss | — | 1.4 | 2.5 | 4.0 |

The average economy loss is also included in the table.

For each percent of bootstrap air used, 0.209% $O_2$ is provided, which indicates 0.313% CO, which is equivalent to about 0.143 $\Delta$ A/F for each percent of bootstrap air. The economy loss has been estimated as averaging about 4% for each $\Delta$ A/F unit. Taking a case at 7% bootstrap air, ± 20%, and ± 0.5 $\Delta$ A/F control, the % CO at the lean edge can be calculated as 3.08%, which sets the lean edge at −1.2 $\Delta$ A/F, making the rich edge − 2.2 $\Delta$ A/F. Thus at the worst the economy loss in this case is 10percent.

In view of various design and catalyst activity factors, a temperature range of about 600°–700°C is preferred for the $NO_x$ converter, and rhodium catalysts are well-suited for operation in such ranges. However, somewhat higher converter inlet temperatures may occur in some phases of engine operation. Such higher temperatures tend to reduce the catalytic activity of rhodium, although the reduction is only temporary and original activity returns when the temperature is lowered. A catalyst containing rhodium as the only active component is still effective, particularly in a bootstrap operation, when utilized over a broadened temperature range, including at times temperatures up to 850°C or more, but results are not as good as when operations are limited to somewhat lower temperatures, such as those not exceeding 700°C. As indicated hereinabove, other catalytically active metals or compounds can be present along with the rhodium. A combination of rhodium and nickel in a catalyst gives good results over a broad temperature range.

EXAMPLE 16

A cordierite monolith was coated with alumina, 3 weight parts alumina being used per 100 weight parts support, and calcined at 600°C. The coated support was then impregnated with nickel and rhodium, solutions of salts (nitrates) of the metals being used for the impregnation. Successive impregnations were employed, with a calcination at 550°C, after the nickel impregnation, and then drying at 120°C following the rhodium impregnation. The catalyst had 0.002 weight parts rhodium and 5 weight parts nickel per 100 weight parts support. The catalyst was employed in a bootstrap operation with a −1.5 $\Delta$ A/F feed and 4.3 percent bootstrap air. The catalyst was employed as fresh catalyst, and also after undergoing hydrothermal aging (HTA) at an inlet temperature of 870°C for 22 hours. For comparison purposes, a 0.0025 rhodium on alumina-coated monolith ($\beta$-spodumene) was used as a reference. The results are reported below:

Table 11

| | $\Omega$ | | |
|---|---|---|---|
| Inlet Temperature | Ni-Rh | | Rh reference |
| | Fresh | HTA | HTA |
| 800°C | 8 | 8 | 42 |
| 600°C | 15 | 10 | 15 |

The results at 800°C in comparison to the reference are particularly noteworthy. The catalyst was then tested by a procedure which simulates the first five minutes of a cold-start constant volume sampling (CVS) test in which the catalyst is used as an oxidation catalyst for the first two minutes, after which time, the secondary air is diverted to the normal location between the $NO_x$ and oxidation converters. On the test the hydrocarbon (HC) and CO percent remaining data reported are for the two minutes that the secondary air is on the test catalyst, while the $\Omega$ is for the third through fifth minute after the cold start. An oven temperature of 500°C was employed.

Table 12

| Ni-Rh | % Remaining | | |
|---|---|---|---|
| | $\Omega$ | HC | CO |
| Fresh | 25 | 77 | 21 |
| HTA | 19 | 97 | 34 |
| Rh reference | | | |
| HTA | 18 | 96 | 34 |

The cordierite monolith employed as a support for the nickel-rhodium catalyst was a monolith with straight through channels with hydraulic diameters of about 0.06 inches, porosity of about 30 percent, and surface area of about 50 square inches per cubic inch.

Catalysts containing nickel and rhodium together can very effectively be used in a bootstrap operation to remove $NO_x$ from automotive exhaust, and in accordance with the various operating modes discussed herein. Such catalysts can utilize amounts of rhodium as taught herein and various amounts of nickel, such as 1 to 15 or more parts nickel per 100 parts support, or more narrowly, 3 to 10 parts nickel, the parts being by weight.

What is claimed is:

1. The process of removing nitrogen oxio from automotive exhaust gases containing a small amount thereof along with carbon monoxide, hydrogen and hydrocarbons, which comprises contacting such gases with a catalyst containing rhodium in catalytically significant amount on a support, in which process an automobile engine is operated richer than necessary to obtain proper exhaust gases stoichiometries for high $NO_x$ conversion, and supplemental air is added to the exhaust prior to contacting the catalyst to obtain proper oxygen content to keep the ammonia production at a very low level but not sufficient to prevent substantially complete reduction of the nitrogen oxides.

2. The process of claim 1 in which the amount of added air is in the range of 0.5 to 25 percent of the exhaust rate.

3. The process of claim 1 in which the amount of added air is at least 3 percent by volume of the exhaust.

4. The process of claim 1 in which the amount of added air is in the range of 3 to 6 percent by volume of the exhaust.

5. The process of claim 1 in which the engine is operated in an air-to-fuel range rich by approximately −0.7 to −1.7 A/F units, and with addition of about 4.3 percent air.

6. The process of claim 1 in which the catalyst contains rhodium and nickel.

7. The process of claim 1 in which the rhodium is on a transition alumina surface and present in an amount no greater than 0.005 percent by weight of the support.

8. The process of claim 7 in which the catalyst contains nickel in an amount of 1 to 10 percent by weight.

9. The process of claim 1 in which the rhodium is present in an amount no greater than 0.003% by weight of the support.

10. The process of claim 1 in which the carburetion range of the engine and the amount of added air are in combination such that the amount of added air approaches the maximum which can be added without preventing substantially complete reduction of the nitrogen oxides at the lean edge of the operating range.

11. The process of claim 10 in which the catalyst contains nickel.

12. The process of claim 1 in which the air-to-fuel ratio range of the engine and the amount of supplemental air are in relationship such that the $CO/O_2$ ratio in the exhaust after addition of the air is in the range of 1.5 to 5 substantially throughout the said air-to-fuel ratio range.

13. The process of claim 1 in which the catalyst support consists of an aluimina-coated monolithic ceramic structure.

14. The process of claim 1 in which additional air is added to the gases from the reduction zone and the gases are contacted with an oxidation catalyst under oxidizing conditions at temperatures on the average high enough to oxidize carbon monoxide and hydrocarbons but not sufficiently high to convert ammonia to NO, and on the average not over 425°C.

15. The process of claim 14 in which rhodium is dispersed on alumina.

16. The process of claim 14 in in which oxygen is present in amount low enough that at least 50% reduction of nitrogen oxides is achieved but still sufficient that less than 50 percent of the nitrogen oxides reduced is converted to ammonia.

17. The process of removing nitrogen oxides from automotive exhaust gases containing a small amount thereof along with carbon monoxide, hydrogen, and hydrocarbons which comprises contacting such gases with rhodium in catalytically significant amounts on a support under conditions which are reducing and with the gases having a $CO/O_2$ ratio maintained within the range of 1.5 to 5 by the operating parameters of the engine producing the gas whereby the average amount of oxygen is such that on the average at least 50 percent reduction of nitrogen oxides is achieved and less than 50 percent of the nitrogen oxides reduced is converted to ammonia.

18. The process of claim 17 in which oxygen is present in amount such that the $CO/O_2$ ratio is in the range of 1.5 to 5 and in which the rhodium is on a transition alumina support.

* * * * *

UNITED STATES PATENT OFFICE
CERTIFICATE OF CORRECTION

PATENT NO. : 3,886,260
DATED : May 27, 1975
INVENTOR(S) : Mark Leroy Unland

It is certified that error appears in the above-identified patent and that said Letters Patent are hereby corrected as shown below:

Column 10, line 19, "adsorption an occur" should read

---adsorption can occur---.

See spec. page 15, line 17.

Column 22, line 8, "possible" should read

---possibly---.

See spec. page 34, line 8.

Column 27, Claim 1, "nitrogen oxio" should read

---nitrogen oxides---.

See Amendment A, (Claim 15).

Signed and Sealed this sixteenth Day of December 1975

[SEAL]

Attest:

RUTH C. MASON
*Attesting Officer*

C. MARSHALL DANN
*Commissioner of Patents and Trademarks*